Oct. 29, 1957    J. D. COMSTOCK    2,811,191
PNEUMATIC TIRE
Filed March 30, 1953
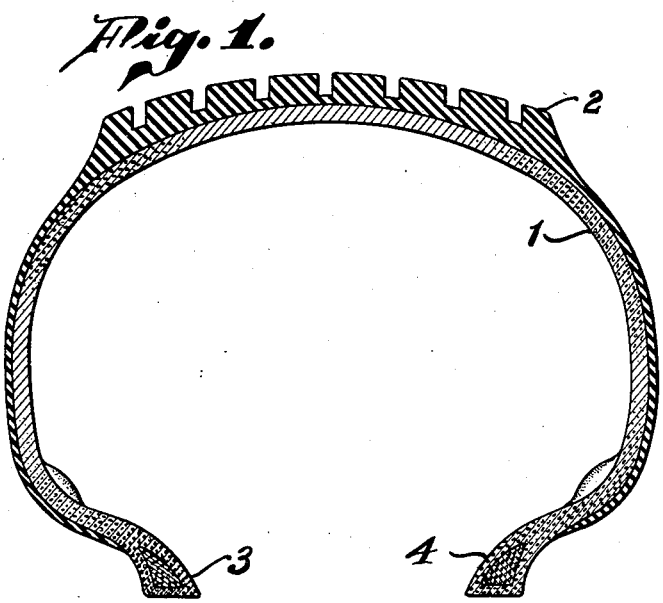
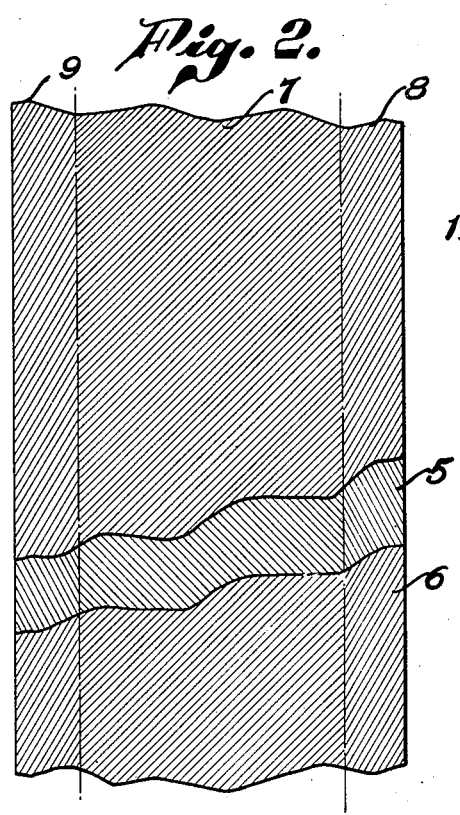
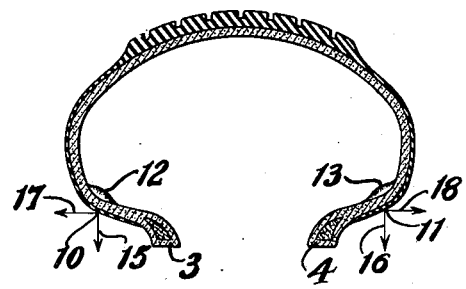
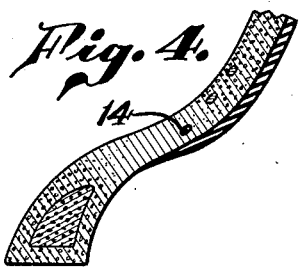
INVENTOR.
JACKSON D. COMSTOCK,
BY
ATTORNEY.

United States Patent Office 2,811,191
Patented Oct. 29, 1957

2,811,191

PNEUMATIC TIRE

Jackson D. Comstock, Los Angeles, Calif.

Application March 30, 1953, Serial No. 345,517

3 Claims. (Cl. 152—356)

The present invention relates to pneumatic tires, and particularly to a casing construction which is constructed in a manner to absorb shock resultant upon striking an obstruction.

An object of the invention is the provision of a tire casing so constructed as to resist rupture without increasing either the quality or amount of material used in its construction.

A further object is the provision of a tire casing capable of giving superior results in actual use and at a lower cost over tires of comparable size.

A further object is the provision of a tire casing constructed to have increased flexibility and impact absorbing capabilities.

With the above mentioned and other objects in view, the invention consists in the novel and useful provision, formation, construction, association, and relative arrangement of parts, members and features, all as shown in certain embodiments in the accompanying drawing, described generally, and more particularly pointed out in the claims.

In the drawing:

Figure 1 is a transverse section of a tire casing incorporating one form of the invention.

Figure 2 is a fragmentary view of the cord construction for the casing shown in Figure 1, Figure 3 is a reduced size transverse sectional view of the casing and movement thereof resultant upon the tread striking an obstruction, and, Figure 4 is a fragmentary transverse sectional view of a portion of a casing incorporating the invention, and of modified construction.

Referring now with particularity to the drawing, I have shown in Figure 1, in transverse section, a pneumatic tire casing having a carcass 1 formed of plies of cords, a tread 2, and beads 3 and 4. In the present description, I have assumed that four plies of cords are utilized, although it is evident that any number of plies may be employed, depending on the use of the tire. These plies of cords are constructed in a particular manner, as illustrated for two plies in Figure 2. Thus, in Figure 2, I have shown an inner ply of cords at 5 and an outer overlapping ply at 6. However, both plies are constructed in the same manner, which is to say that a central portion of the ply of cords, indicated at 7, has an angularity relative to a transverse plane passed through said ply of cords different from the angularity of the ply of cords inward from the marginal edges thereof, as shown at 8 and 9. Specifically, the cords in the area 7 are substantially at a 45° angle to a transverse cutting plane and also to a plane at right angles thereto, i. e., a plane through the center line of the ply and the tire itself, while the cords for the marginal areas 8 and 9 are at substantially a 60° angle relative to the same transverse plane passing through the axis of the tire which is the same as the axis of the axle on which the tire will be mounted.

In order to form the plies in the manner shown in Figure 2, all of the plies which have 60° cords are laid one over the other, in the usual manner, and as shown in Figure 2, the cords of one ply alternating as to angularity to a second ply. Before alternating the plies as in Figure 2, a chosen number of plies, all with their cords parallel and at 60° to the cut side edges, are gripped between clamps for a given distance inward from the marginal edges and these marginal edge portions, such as 8 and 9, are to retain 60° cord relationship. If now the clamps are shifted longitudinally one with respect to the other, a short distance, the cords in the area 7 will assume an angularity less than 60° and, in this instance, a 45° angle to a transverse plane. As the rubber of the plies is uncured, the cords will retain the approximate deformation given by the clamps; in other words, the cords in area 7 will be at 45° angle and the cords for areas 8 and 9 at 60° angle. The 45° cord area 7 extends from substantially zone 10 to zone 11, in Figure 3, and the 60° cords extend from the zones aforesaid to the beads 3 and 4. Enlargements 12 and 13 are placed within the tire carcass before curing at the angle of change of the cords or below a tangent to the side wall of the tire, normal to the axis of the tire, and preferably at a distance not less than 4% of the cross sectional circumference from the point of change of the cords on each side of the tire. These zones or enlargements 12 and 13 are convex surfaced. Preferably, each bulge or enlargement is formed of rubber compounded for low elasticity, or reinforced with cords or fabric so as to provide an approximately non-extensible portion.

In Figure 4, which is a modification of Figure 3, I have embedded within the tire carcass at the zones 10 and 11, wires 14, the function of which is to prevent extension of the tire at these zones. I have purposely neglected to show any breaker strip between the tread and the carcass. I have shown, however, the usual rubber side wall overlying the carcass and merging with the tread material.

The operation, uses and advantages of the invention just described, are as follows:

The area 7 of the plies of cords 5 and 6 are in substantially right angular relationship. Consequently, if transverse tension were exerted upon the two plies of cords for this area, there would be substantially no change of angle thereof, dependent, however, upon the magnitude of stress exerted above normal usage. The marginal areas 8 and 9 for the plies of cords 5 and 6 are at a 60° angle, and thus at a 15° greater angle than the angle of the cords for the area 7 relative to a transverse cutting plane. If now the marginal portions 8 and 9 for the plies of cords 5 and 6 were grasped and stretched, movement would occur in said marginal portions for the reason that there is an angular relationship between the marginal portions and the areas 7 of the plies 5 and 6.

The tire casing actually increases in cross section between the beads and the zones 10 and 11 on impact with an obstruction, and thereby momentarily reduces pressure by confining said increase in cross section to the distance between the beads and the zones 10 and 11. If we assume that the tire has the cross section of Figure 1 when inflated, and under normal load, upon the tread striking an obstruction, the tire may take the form shown in Figure 3.

The vertical load deflections are indicated by the arrows 15 and 16 from the zones 10 and 11. As there is substantially no stretch in the carcass between the zones 10 and 11, the carcass between the beads and the zones 10 and 11 will move outwardly, as indicated by the arrows 17 and 18, due to the cord angle for the areas 8 and 9. This stretch, as indicated by arrows 17 and 18, exerts a pull on the side walls of the tire and tread portions which assists in moving the tread away from the obstruction or obstacle. Furthermore, the zones 10 and 11 will readily move toward the rim, or in the direction indicated by the arrows 15 and 16, which also aids in moving the tread 2 away from an obstruction.

The provision of the bulges 12 and 13 or of the wires 14, which overlie the plies of cords on a line which divides the 60° cords from the 45° cords, assures that the cords will maintain the angular relationship stated; otherwise, the carcass, under air pressure, would tend to align the 45° and the 60° cords. It is, of course, obvious that angular relationships between the cords may differ from the 45° and 60° mentioned as long as the basic principle of the invention is retained, which is to say that marginal areas of a ply of cords shall have a given angularity which is different from the angularity of the ply of cords intermediate said marginal areas, with the idea of giving the marginal areas greater stretch than is obtained in the intermediate area.

I claim:

1. A pneumatic tire having stranded carcass reinforcing elements arranged in laminated plies extending around non-extensible bead assemblies, said stranded elements in a given ply being parallel and extending on a bias from one bead of the tire to the other along a path in which the two side portions are at the same angle and the central portion of the cords is at a lesser angle, the angle of the parallel stranded elements in the two side portions being roughly 60° and the angle in the central portion being approximately 45°, said angles being measured by the smaller angle the line of cord makes with a radial plane passing through the axis of the tire, the change in angle at the two junctions being abrupt and the tire being reinforced at each of the two junctions by a non-extensible member whereby to prevent extension of the tire at the annular junctions.

2. The tire of claim 1 in which the non-extensible means comprises a plurality of annular wires imbedded in the carcass or casing of the tire.

3. The tire of claim 1 in which the non-extensible means comprises two annular members on the inside of the inner ply of the carcass or casing and includes a convex bulge of low elasticity material.

References Cited in the file of this patent

UNITED STATES PATENTS

| | | |
|---|---|---|
| 1,461,984 | Pfeiffer | July 17, 1923 |
| 1,554,370 | Renner | Sept. 22, 1925 |
| 2,186,178 | Shoemaker | Jan. 9, 1940 |
| 2,700,998 | Wallace | Feb. 1, 1955 |

FOREIGN PATENTS

| | | |
|---|---|---|
| 649,819 | Great Britain | Jan. 31, 1951 |